United States Patent
Nakamura et al.

(10) Patent No.: US 7,130,307 B2
(45) Date of Patent: Oct. 31, 2006

(54) DATA RELAY METHOD, ITS APPARATUS, AND DATA RELAY SYSTEM USING THE APPARATUS

(75) Inventors: Makoto Nakamura, Tokyo (JP); Tomoki Murai, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 997 days.

(21) Appl. No.: 10/015,658

(22) Filed: Dec. 17, 2001

(65) Prior Publication Data

US 2002/0194367 A1    Dec. 19, 2002

(30) Foreign Application Priority Data

Jun. 14, 2001    (JP)    ............................. 2001-180425

(51) Int. Cl.
*H04L 12/28* (2006.01)
*H04L 12/56* (2006.01)

(52) U.S. Cl. .................... 370/395.5; 370/466; 370/467

(58) Field of Classification Search ............. 370/395.5, 370/466–467, 401, 352, 389, 392, 474, 400, 370/393, 394, 395.1, 395.31, 395.32, 469, 370/235, 252, 395.52, 395.53; 709/245, 709/238, 233, 213, 242, 229, 247, 230, 228, 709/249, 235, 217, 206, 224
See application file for complete search history.

(56) References Cited

U.S. PATENT DOCUMENTS

| | | | | |
|---|---|---|---|---|
| 5,388,213 A | * | 2/1995 | Oppenheimer et al. | 709/245 |
| 5,852,721 A | * | 12/1998 | Dillon et al. | 709/217 |
| 5,968,129 A | * | 10/1999 | Dillon et al. | 709/233 |
| 6,115,750 A | * | 9/2000 | Dillon et al. | 709/235 |
| 6,321,268 B1 | * | 11/2001 | Dillon et al. | 709/233 |
| 6,526,056 B1 | * | 2/2003 | Rekhter et al. | 370/392 |
| 6,751,221 B1 | * | 6/2004 | Saito et al. | 370/392 |
| 6,836,481 B1 | * | 12/2004 | Hotta | 370/392 |
| 2001/0040895 A1 | * | 11/2001 | Templin | 370/466 |
| 2002/0012320 A1 | * | 1/2002 | Ogier et al. | 370/252 |
| 2002/0026482 A1 | * | 2/2002 | Morishige et al. | 709/206 |
| 2002/0062388 A1 | * | 5/2002 | Ogier et al. | 709/238 |
| 2002/0069292 A1 | * | 6/2002 | Gaddis et al. | 709/238 |
| 2002/0080819 A1 | * | 6/2002 | Tsao | 370/469 |
| 2002/0099854 A1 | * | 7/2002 | Jorgensen | 709/249 |
| 2002/0101868 A1 | * | 8/2002 | Clear et al. | 370/389 |
| 2003/0061338 A1 | * | 3/2003 | Stelliga | 709/224 |
| 2003/0095504 A1 | * | 5/2003 | Ogier | 370/235 |

* cited by examiner

*Primary Examiner*—Ricky Q. Ngo
*Assistant Examiner*—Jamal A. Fox
(74) *Attorney, Agent, or Firm*—Oblon, Spivak, McClelland, Maier & Neustadt, P.C.

(57) ABSTRACT

A plurality of relay apparatuses are provided within an IP network of an ISP, and these relay apparatuses are connected to each other by logical tunnels. Each relay apparatus determines the type of a destination address at the Layer 2 level from the data loaded from a host device. When the type is for broadcast, the relay apparatus identifies a tunnel as a relay destination from the data contents set in correlation with destination addresses at the Layer 3 level, and transmits the data only to the relevant relay destination tunnel.

1 Claim, 14 Drawing Sheets

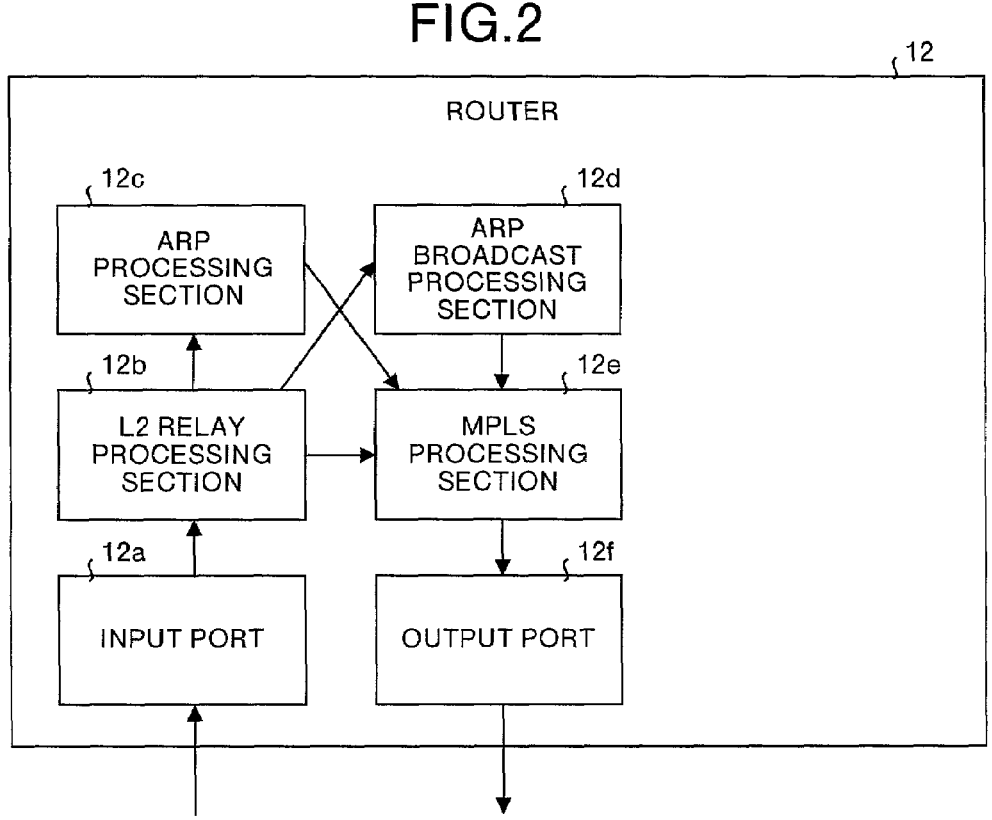

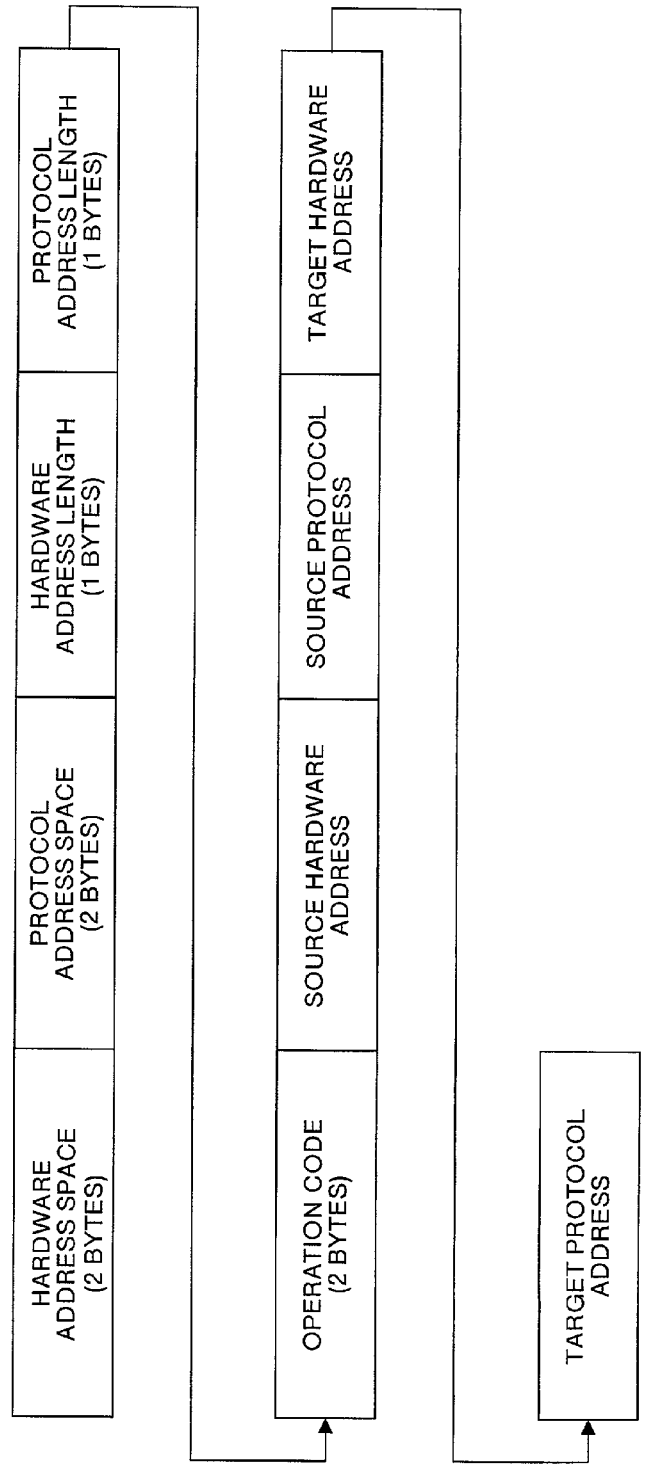

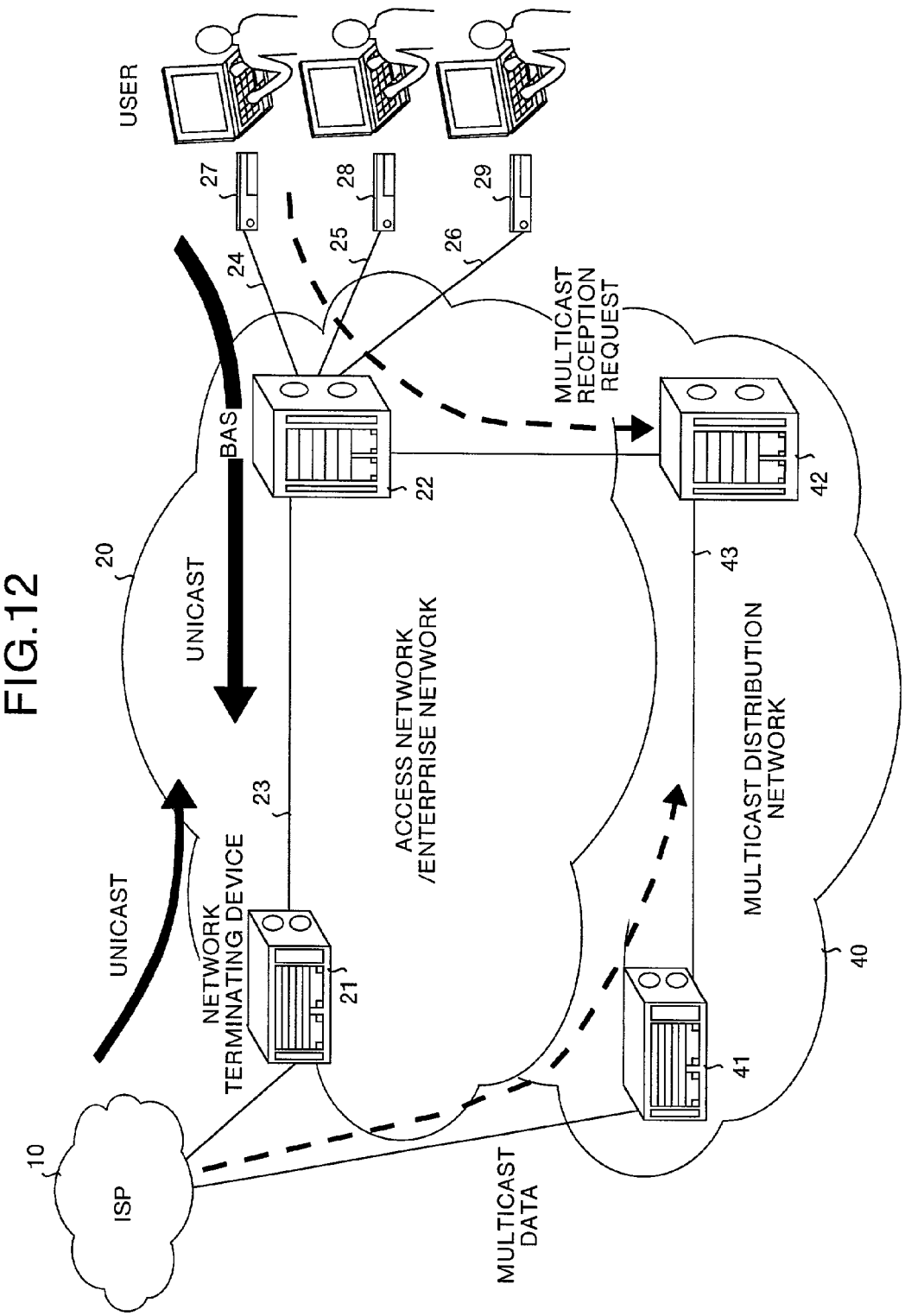

| UNICAST ADDRESS | MULTICAST ADDRESS |
|---|---|
| 1.1.1.1 | 2 2 4.X.X.X |
| 2.2.2.2 | 2 2 4.Y.Y.Y |
| : | : |

DATA RELAY METHOD, ITS APPARATUS, AND DATA RELAY SYSTEM USING THE APPARATUS

FIELD OF THE INVENTION

The present invention relates to a data relay method of constituting a virtual network to relay data, its apparatus, and to a data relay system using the apparatus.

BACKGROUND OF THE INVENTION

Such a conventional data relay method provides service by an IP-VPN, which is service equivalent to service provided by a private line, obtained by establishing a logical tunnel on, for example, a backbone IP network of an ISP. For instance, an intranet such as an intracorporate network, that has been set up conventionally by using a private line, is constructed by utilizing this IP-VPN service of the ISP.

In such IP-VPN service, networks constructed by terminals (host devices) such as PCs of plural users share the backbone IP network of the ISP. Therefore, the IP-VPN service has an advantage such that a network can be constructed at lower cost as compared to the service through a private line singly used by a user. Further, the IP-VPN service is relay service using the Layer 3 (Network layer) level, and also provides a connection service between LANs that relays through LANs of users at the Layer 2 (Data Link layer) level to make a connection between the LANS.

An ADSL (Asymmetric Digital Subscriber Line) being widespread based on an Internet access network or an optical fiber access network uses technology called PPPoE (Point to Point Protocol over Ethernet), and host devices of users and an ISP are connected through a network set-up by an access-network service enterprise (hereafter called "access network"). At this time, tunneling technology called L2TP (Layer 2 Tunneling Protocol) or MPLS (Multiprotocol Label Switching) is used to provide one-to-one communication within the access network. In this tunneling technology, a new header is added to data communicated between the host device of a user and the ISP within the access network to encapsulate the data, and the data is relayed within this access network.

FIG. 20 is a schematic constructional diagram showing a system construction of a conventional Internet access network that relays data via the ADSL. In this figure, the access network 20 is set up by the internally provided network terminating device 21 and BAS (Broadband Access Server) 22, and the logical tunnel 23 is established between the network terminating device 21 and BAS 22. The IP network 10 of the ISP is connected with the network terminating device 21 through a line L, and the host devices 27 to 29 of users A to C are connected to the BAS 22 through respective ADSLs (telephone lines) 24 to 26. The data transmitted from the IP network 10 of the ISP is input into the network terminating device 21 through the line L, where the data is subjected to relay processing, and the data is forwarded to the BAS 22 through the logical tunnel 23, and distributed to the respective host devices 27 to 29.

That is, when data is to be distributed from the IP network 10 of the ISP to each user, the data transmitted from the IP network 10 of the ISP is loaded into the network terminating device 21 in a packet structure consisting of IP header and data. This packet is added with header for tunnel within the access network 20 (IP header within an enterprise network) and PPP (Point-to-Point Protocol) header in the network terminating device 21, and is transmitted to the BAS 22. The BAS 22 removes only the header for tunnel from the packet and transmits the packet as PPP data to the respective host devices 27 to 29 through the ADSLs 24 to 26.

SUMMARY OF THE INVENTION

It is an object of this invention is to provide a data relay method capable of effective data distribution by utilizing existing facilities without requiring data copy, an apparatus for this method, and a data relay system using this apparatus.

In a data relay method according to this invention, a logical tunnel is established within a specified backbone network interposed between networks and data having a specified format is relayed between the networks through the tunnel. This data relay method comprises a determining step of determining a type of a destination address at the Data Link layer (Layer 2 level) from the data loaded from the network into the backbone network; a transmitting step of transmitting the data to the tunnel as a relay destination that is determined for each address when the determined type is an address for an individual; and an identifying/transmitting step of identifying the tunnel as a relay destination from data contents set in correlation with the destination addresses at the Network layer when the type is a broadcast address, and transmitting the data to the identified relay destination tunnel.

In a data relay method according to this invention, a logical tunnel is established within a specified public network interposed between a specified backbone network and host devices and data is relayed between the backbone network and the host devices through the tunnel. This data relay method comprises a determining step of monitoring contents of the data loaded from the host device and determining whether the data is user data; a relaying step of relaying data through the tunnel when the data is the user data; and a control processing step of performing control processing on the data without being routed through the tunnel when the data is a predetermined control packet.

In a data relay method according to this invention, data is relayed between a backbone network and host devices through a public network. This data relay method comprises an address converting step of converting a destination of the data transmitted from the backbone network to a specific IP address within the public network, to a broadcast address of a particular group previously set; a forwarding step of forwarding the data, whose address has been converted, to a multicast network within the public network; and a distributing step of distributing the forwarded data to the host devices.

A data relay apparatus according to this invention is disposed within a specified backbone network interposed between networks, and relays data having a specified format from the network through a logical tunnel established within the backbone network. This data relay apparatus comprises a storage unit that stores information for a relay destination tunnel in correlation with a destination address at the Network layer of the data, a type determination unit that determines a type of a destination address at the Data Link layer of the data loaded from the network; and a transmission unit that transmits the data to the relay destination tunnel corresponding to the destination address at the Network layer stored in the storage unit when the type of the destination address is a broadcast address.

A data relay apparatus according to this invention is disposed within a specified public network interposed between a specified backbone network and host devices, and relays data between the backbone network and the host devices through a logical tunnel established within the public network. This data relay apparatus comprises a first type determination unit that monitors contents of the data loaded from the host device and determines a type of the data; a first relay unit that relays the data through the tunnel when the type of the data is targeted for a single traffic; and a control processing unit that performs control processing on the data without being routed through the tunnel when the data is a predetermined control packet.

A data relay apparatus according to this invention is disposed within a specified public network interposed between a specified backbone network and host devices, and relays data between the backbone network and the host devices through a logical tunnel established within the public network. This data relay apparatus comprises a second type determination unit that monitors contents of the data loaded from the backbone network and determines a type of the data; a second relay unit that relays the data through the tunnel when the type of the data is targeted for a single traffic; and a storage control unit that stores the data when the type of the data is targeted for broadcast to a particular group.

A data relay apparatus according to this invention is disposed within a specified public network interposed between a specified backbone network and host devices, and relays data between the backbone network and the host devices through a logical tunnel established within the public network. This data relay apparatus comprises an address conversion unit that converts a destination of the data transmitted to a specific IP address within the public network, to a broadcast address of a particular group previously set, a forwarding unit that forwards the data, whose address has been converted, to a multicast network logically constituted within the public network; and a distribution unit that distributes the forwarded data to the host devices.

A data relay system according to this invention has a logical tunnel established within a specified backbone network disposed between networks, and relays data having a specified format between the networks through the tunnel. This data relay system has the data relay apparatus provided within the backbone network, and the data relay apparatus transmits the data loaded from the network to a relay destination tunnel corresponding to a broadcast address at the Data Link layer of the data.

A data relay system according to this invention has a logical tunnel established within a specified public network interposed between a specified backbone network and host devices, and relays data between the backbone network and the host devices through the tunnel. This data relay system has the data relay apparatus within the public network, and the data relay apparatus performs control processing on the data without being routed through the tunnel when the data loaded from the host device is a predetermined control packet.

Other objects and features of this invention will become apparent from the following description with reference to the accompanying drawings.

BRIEF DESCRIPTION OF THE DRAWINGS

FIG. 2 is a block diagram showing a configuration of the router shown in FIG. 1.

FIG. 3 is a diagram showing data contents of a tunnel control table for target IP addresses in the ARP broadcast processing section shown in FIG. 2.

FIG. 4 is a diagram showing data contents of a MAC address learning table in the ARP processing section shown in FIG. 2.

FIG. 10 is a diagram showing a data format of the MAC header for an ARP request packet.

FIG. 11 is a diagram showing a data format of the ARP data shown in FIG. 10.

FIG. 12 is a constructional diagram showing a construction of a second embodiment of the data relay system using the data relay method according to this invention.

DETAILED DESCRIPTION

The present invention has been achieved in order to solve the following problems.

Since the conventional IP-VPN provides relay service at the Layer 3 level, channel information for a user at Layer 3 needs to be stored within the ISP. When the scale of the network on the user side or address is changed, the change has to be notified to the ISP whenever it is changed. The ISP has to change setting of relay apparatuses or operate respective control software for exchanging the channel information and has to exchange the mutual channel information. Therefore, even if the change is minor, exchange of channel information is required within the same virtual network. Accordingly, information to be exchanged increases as the scale of the virtual network is enlarged. Thereby, data amounts to be transferred increase and time for exchanging data increases. Thus, there has been a problem that heavy load is applied to the system.

In the case of relay service at the Layer 2 level, broadcast frame relay is required, and when the relay apparatus on the ISP side receives this broadcast frame, the ISP has to copy the data to relay it to all of the other sites. In the case of Layer 2 relay, connection services are provided only within the same data link. Therefore, for example, when an Ethernet frame is to be relayed, a relay destination is required to be an Ethernet-based LAN. Thus, there has been a problem that a connection cannot be made to any network connected by an ATM private line.

Further, when broadcast data is distributed, which is called technology of multicast distribution, the system interposed between access networks has some problems as follows.

That is, the multicast distribution technology, used for data such as data for broadcasting, distributes the same broadcasting data simultaneously to a plurality of users. In the conventional technology, one-to-one communication is performed between the ISP and each user. Therefore, even when the multicast distribution technology is used, the data needs to be distributed to each user, so that the data should be copied for the number of users and distributed in the same manner as that of the ordinary unicast communications. Thus, there has been a problem that an extremely large number of transmission bands are required.

Figure 21:
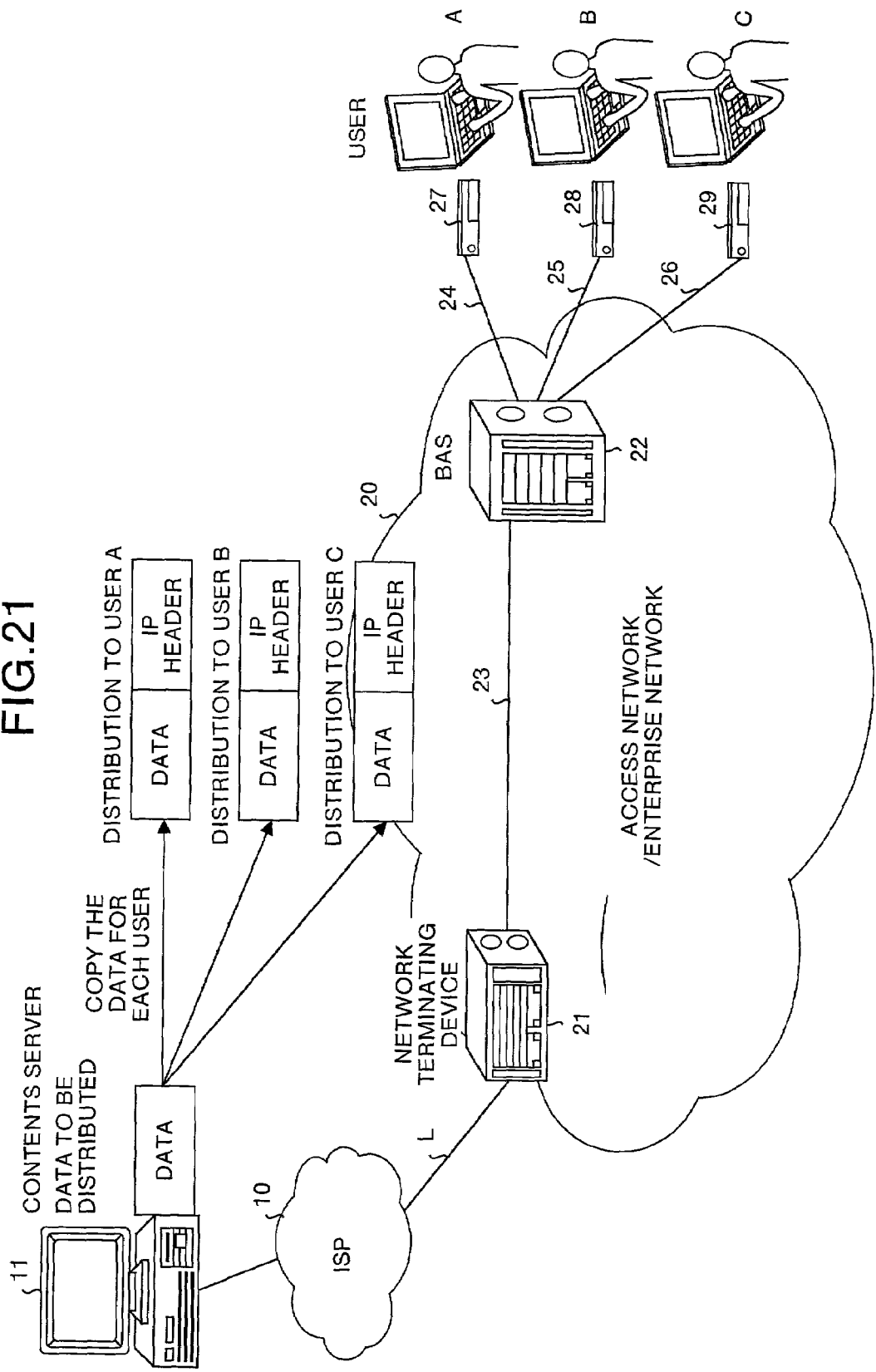
FIG. 21 is a constructional diagram showing the schematic system construction of the conventional Internet access network for explaining problems.

That is, as shown in FIG. 21, when the same data is to be transmitted from the contents server 11 disposed within the IP network 10 of the ISP to the respective host devices 27 to 29 of the users A to C, the network terminating device 21 composed of a router and each of the host devices 27 to 29 perform one-to-one communication. Therefore, the contents server 11 (or the network terminating device 21) needs to copy the data and transmit the copied data to the respective host devices 27 to 29. Therefore, in the conventional technology, there has been a problem that the contents server and the network require transmission bands and each throughput for transmission data x the number of users to receive data.

Further, it is generally conceivable that there are a plurality of relay apparatuses between the contents server and the network terminating device of an access network enterprise. In order to utilize the multicast distribution technology under such situations, it is necessary to change software and setting information of these relay apparatuses that have been already operated so as to support the multicast distribution technology. Thus, there has been a problem that enormous cost and time are required for these changes.

Figure 20:
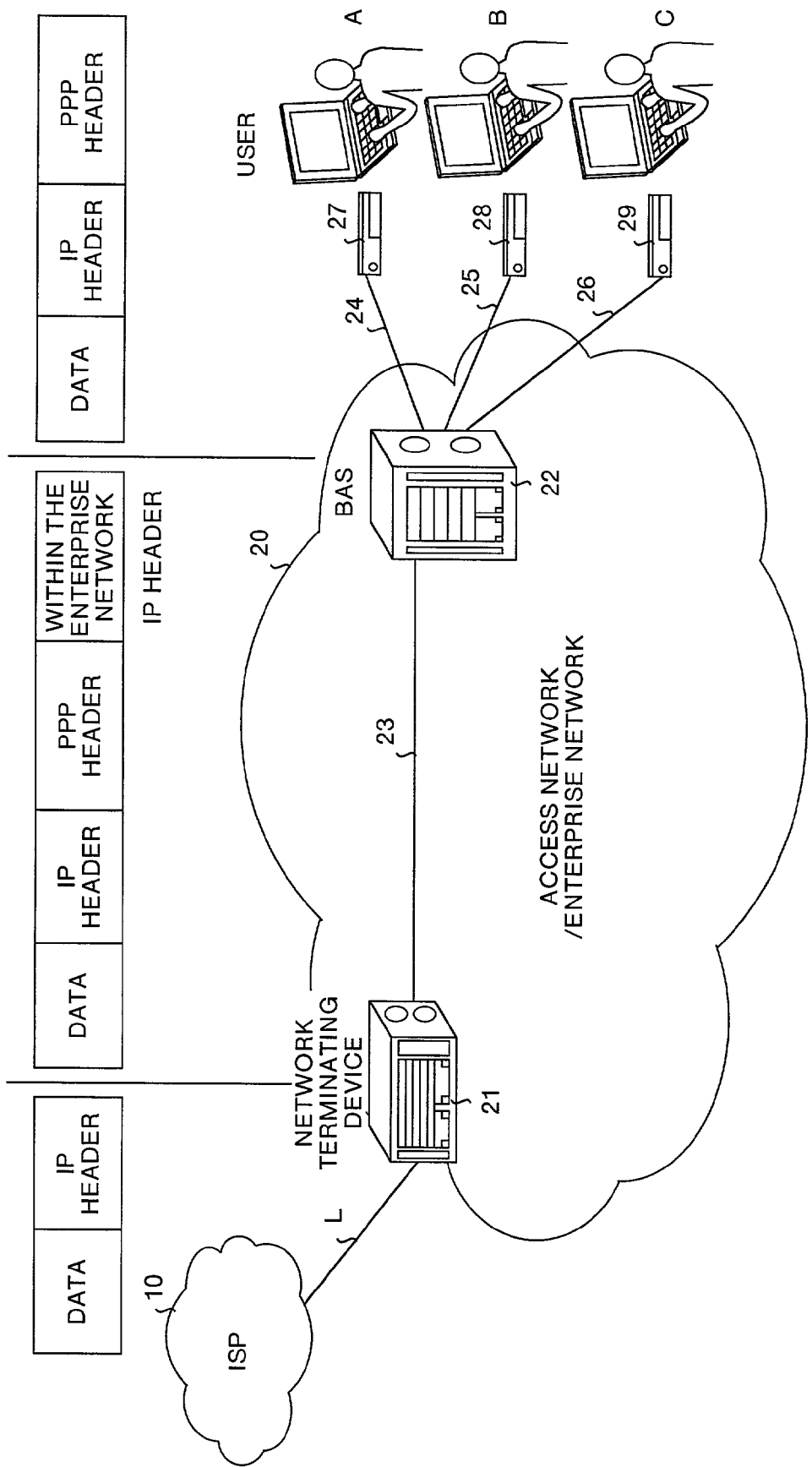
FIG. 20 is a constructional diagram showing a schematic system construction of the conventional Internet access network that relays data through ADSL.

Preferred embodiments of the data relay method, its apparatus, and the data relay system using this apparatus will be explained below with reference to the attached drawings. In this invention, basically, data relay at Layer 2 is performed to solve the problems on broadcast. Hereinafter, the same legends are assigned to those corresponding to the sections in FIG. 20 for convenience in explanation.

Figure 1:
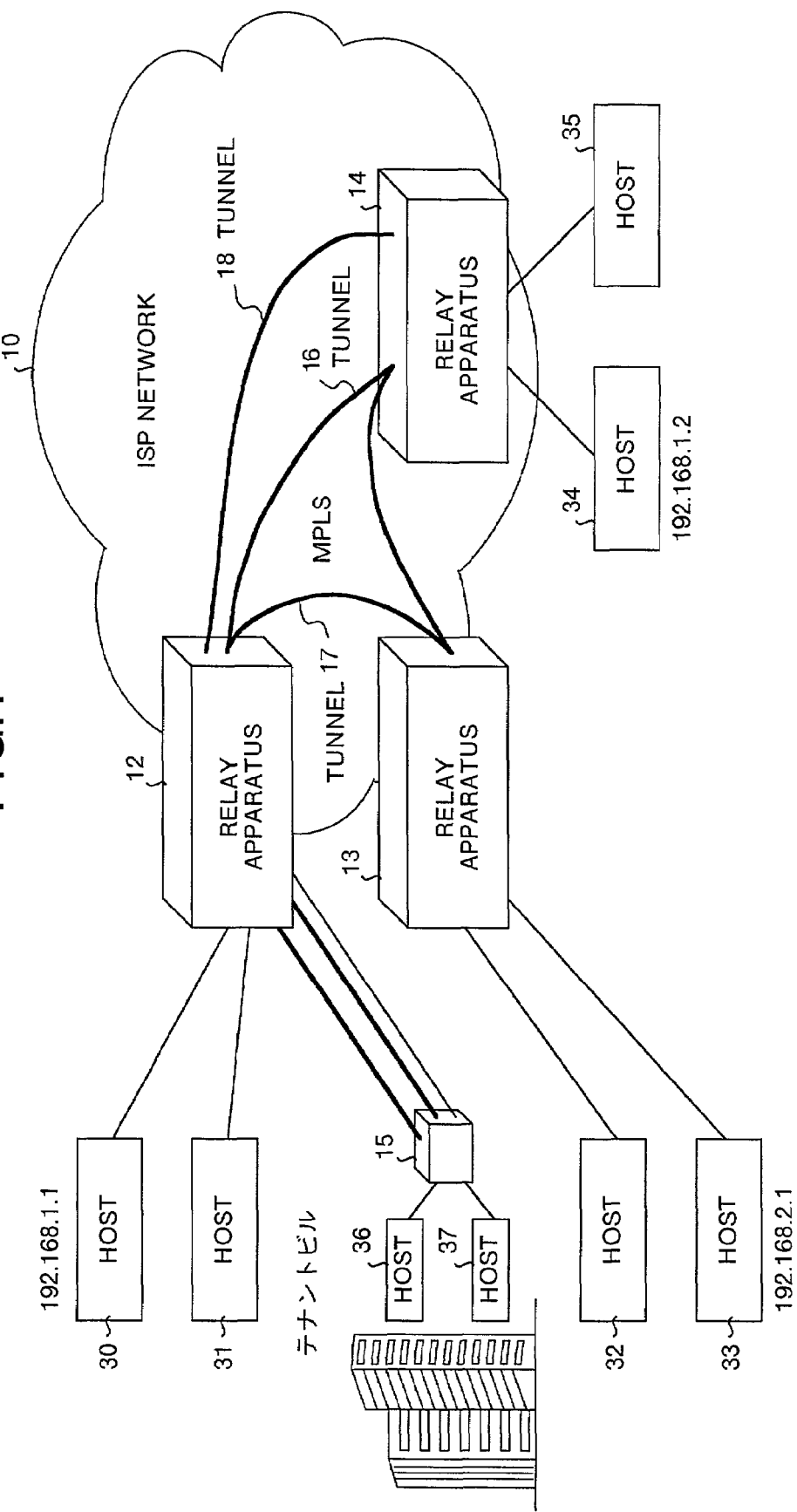
FIG. 1 is a constructional diagram showing a construction of a first embodiment of the data relay system according to this invention.

FIG. 1 is a constructional diagram showing the construction of a first embodiment of the data relay system using the data relay method according to this invention. In the figure, there are plural relay apparatuses, three routers 12 to 14 in this embodiment, provided within the IP network 10 of an ISP, and logical tunnels 16 to 18 are established between these routers 12 to 14 by using MPLS technology. These routers 12 to 14 are connected to host devices 30 to 35 of users on the network (Ethernet) side through respective ports explained later. The router 12 is connected to, for example, host devices 36 and 37 of users in a tenant building through another router 15. This system utilizes IP-VPN service of the ISP. Further, the routers 12 to 14 are assumed to perform data relay at the Layer 2 level with respect to the host devices 30, 32, 34, and 36, and to perform data relay at the Layer 3 level with respect to the host devices 31, 33, 35, and 37.

Numbers are previously set in the routers 12 to 14 and the respective tunnels, for example, numbers *1, *2, and *3 are set in the routers 12, 13, and 14, while numbers #1, #2, and #3 are set in the tunnels 16 to 18, respectively. It should be noted that the tunnels 16 and 18 using the MPLS technology are channels between the routers 12 and 14, which indicates that these two channels logically share a physical line (signal line), and this physical line may be one or plural. Further, the tunnel 17 can also share a physical line with other channels.

Since the routers 12 to 14 have the same configuration, the configuration of the router 12 as a typical one is shown in FIG. 2. In the figure, the router 12 comprises the input port 12a to which data is input, L2 relay processing section 12b that executes relay processing at the Layer 2 level of the data, ARP (Address Resolution Protocol) processing section 12c that performs ARP processing when the data is an ordinary ARP packet, ARP broadcast processing section 12d that performs broadcast processing when the data is an ARP packet for broadcast, MPLS processing section 12e that switches the processed data so as to utilize the IP-VPN service of the ISP by using tunneling technology, and the output port 12f that outputs the MPLS-processed data.

The ARP broadcast processing section 12d has the tunnel control table for target IP addresses as shown in FIG. 3. This tunnel control table has target IP addresses indicating transmission destinations, relay destination tunnel numbers and router numbers corresponding to the IP addresses, and Layer 2 or Layer 3 relay system registered therein. The contents of this tunnel control table can previously be set in each router or can be set by notification of broadcast or the like.

The L2 relay processing section 12b has the MAC address learning table as shown in FIG. 4. This learning table has destination MAC addresses, relay destination tunnel numbers and relay apparatus (routers) numbers corresponding to the respective destination MAC addresses, which are previously registered in the table.

Figure 5:
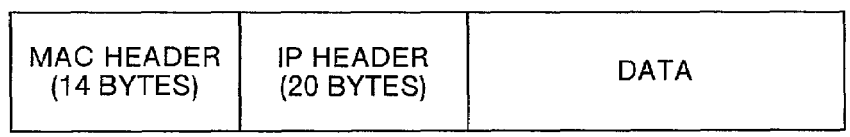
FIG. 5 is a diagram showing a data format of the data transmitted between the host device and the router shown in FIG. 1.
Figure 6:
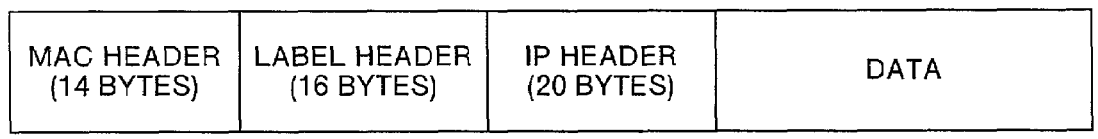
FIG. 6 is a diagram showing a data format of the data transmitted between the routers shown in FIG. 1.
Figure 7:
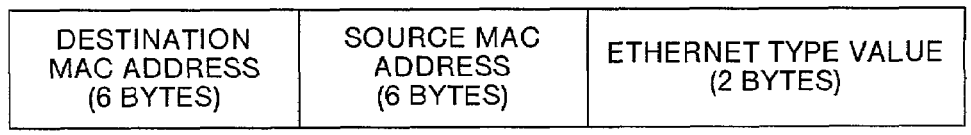
FIG. 7 is a diagram showing a data format of the MAC header shown in FIG. 6.

The data format of data transmitted between the host device and the router consists of MAC header at the Layer 2 level, IP header at the Layer 3 level, and data, as shown in FIG. 5. Further, the data format of data transmitted between the routers consists of MAC header, label header, IP header, and data, as shown in FIG. 6. This MAC header consists of a destination MAC address, a source MAC address, and an Ethernet type value, as shown in FIG. 7.

Figure 8:
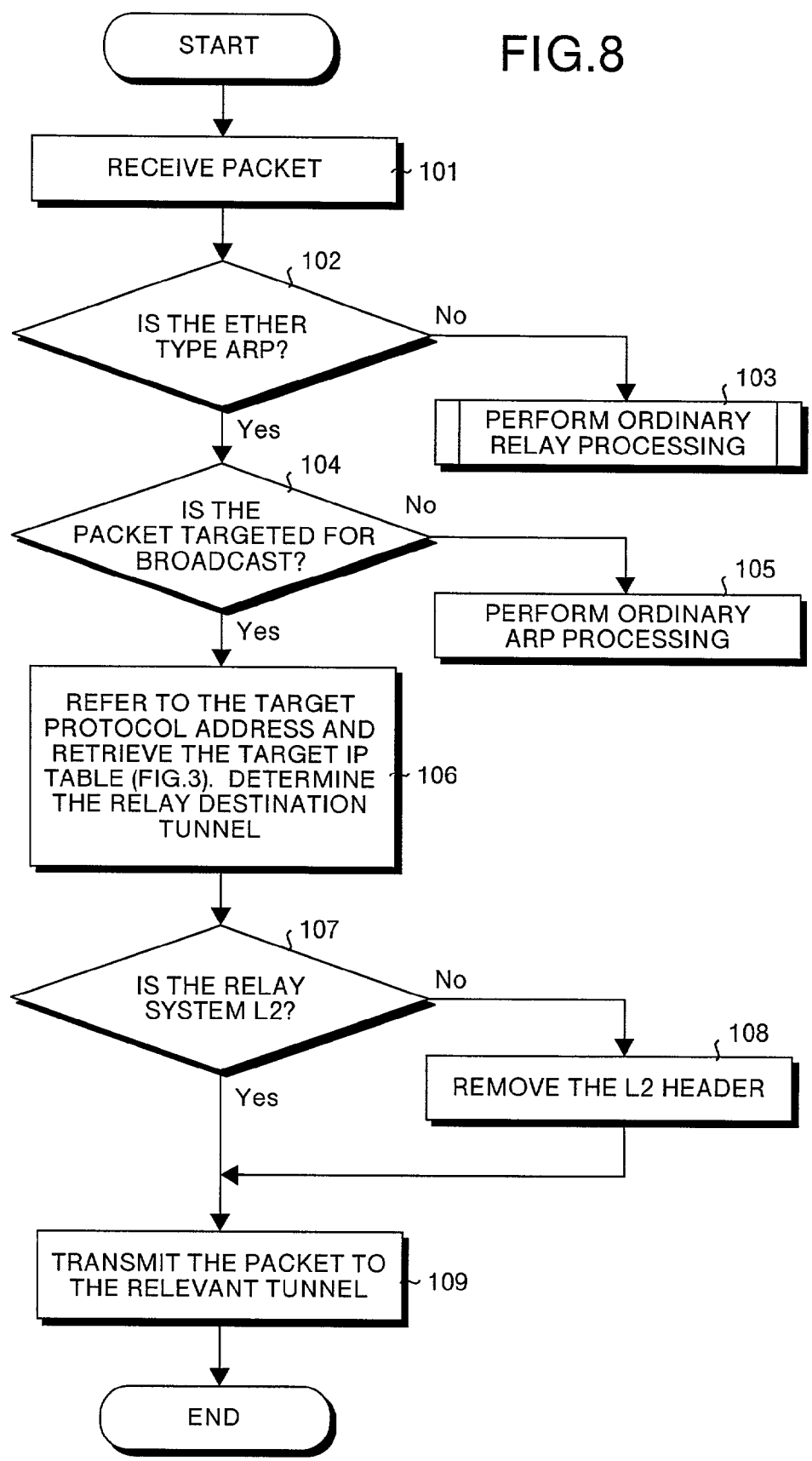
FIG. 8 is a flowchart for explaining data relay operation of the router.

In the structure, each of the routers 12 to 14 within the system relays data as shown in the flowchart of FIG. 8. That is, in FIG. 8, when a packet is received by the L2 relay processing section 12b (see FIG. 2) through the input port 12a (step 101), the L2 relay processing section 12b determines whether or not the Ethernet type in the MAC header (see FIG. 5 and FIG. 7) is the ARP (step 102).

When the type is not the ARP, the L2 relay processing section 12b shifts the processing to ordinary relay processing executed by the MPLS processing section 12e explained later (step 103), or determines whether the MAC address is for broadcast by referring to the destination MAC address in the MAC header when the type is the ARP (step 104). More specifically, when a value of the destination MAC address is "FFFFFFFFFFFF" (hexadecimal) or the least significant bit of a first byte is "1", the value indicates the broadcast address, and when the least significant bit of the first byte is "0", the value indicates an address for an individual.

When the destination MAC address is the individual address, the processing is shifted to the normal ARP processing executed by the ARP processing section 12c, where a transmission destination (tunnel and router) corresponding to the destination MAC address is specified by referring to the MAC address learning table shown in FIG. 4. For example, when the destination MAC address is "00: 01: 01: 01: 01: 01" in the MAC address learning table, the packet is transmitted to the router *3 by using the tunnel of the number #1 (step 105).

When the destination MAC address is for the broadcast, the processing is shifted to the ARP broadcast processing section 12d, where a higher layer is further checked. For example, the case of an ARP request packet to resolve a MAC address with respect to an IP address will be explained below based on the data format of the MAC header in the ARP request packet shown in FIG. 10 and the contents of the ARP data in FIG. 11.

When receiving the ARP request packet shown in FIG. 10 from the host device on the user side, the router refers to the Ethernet type value first, and determines it as the ARP packet from "0x0806", and then refers to the destination MAC address to check a higher layer (Network layer) because this MAC address is for broadcast. Based on checking of the higher layer, the router determines this packet as a request packet for the IP address from the protocol address space and the operation code, and then refers to the target protocol address. Because this target protocol address is a target IP address "192.168.1.2" of the host device 34 connected to the router of number *3, the router retrieves the tunnel control table of FIG. 3, and determines the relay destination tunnel toward the router 14, in this case, the tunnel 16 of number #1 (step 106).

Subsequently, the router determines whether the relay system is L2 (Layer 2 level) from this control table (step 107). Since the relay system is L2 in this embodiment, the router transmits the ARP request packet to the relevant relay destination tunnel 16 (step 109). When the relay system is not L2, the router removes the MAC header as the header for L2 from the ARP request packet (step 108) and then transmits the ARP request packet to the relevant relay destination tunnel (step 109).

Figure 9:
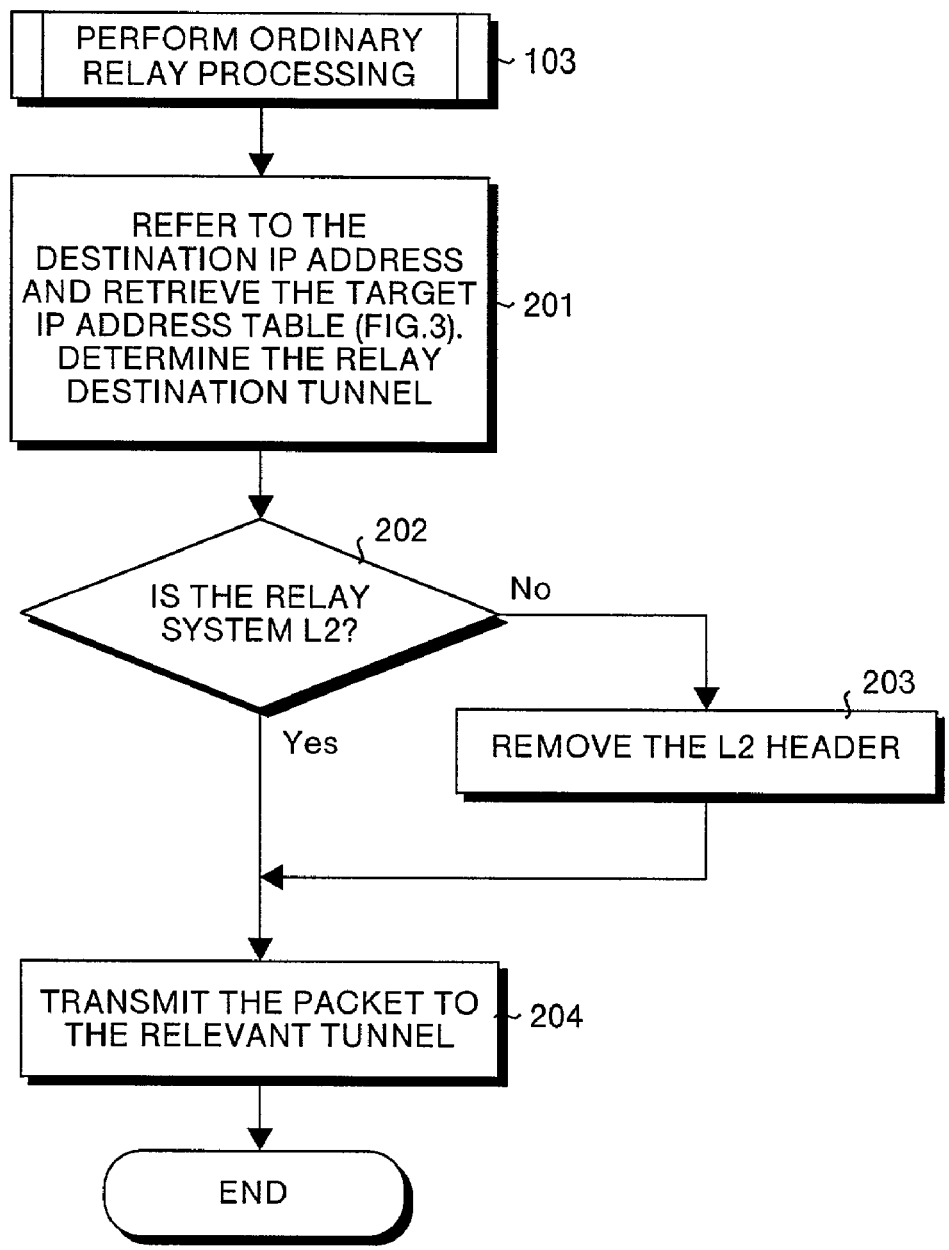
FIG. 9 is a flowchart for explaining operation of ordinary data relay processing by the MPLS processing section shown in FIG. 2.

By the way, at step 102, when the Ethernet type in the MAC header is not the ARP, the processing is shifted to the ordinary relay processing shown in FIG. 9 executed by the MPLS processing section 12e. In this processing, the MPLS processing section 12e refers to the destination IP address first, retrieves the tunnel control table of the target IP addresses in FIG. 3, and determines the relay destination tunnel from the contents (step 201).

Subsequently, the MPLS processing section 12e retrieves a relay system from the table and determines whether the relay system is L2 (step 202). When the relay system is not L2, the MPLS processing section 12e removes the L2 header from the packet (step 203), and transmits the packet to the relevant relay tunnel (step 204).

As explained above, in the data relay system shown in the first embodiment, the type of the destination MAC address at the Layer 2 level is determined from the data loaded into the network of the ISP. When the type indicates broadcast, the number of the relay destination tunnel is identified from the data contents set in the tunnel control table in correlation with the target IP addresses at the Layer 3 level, and the data is transmitted only to this relay destination tunnel. Therefore, by omitting copying of data, data relay efficiency can be enhanced.

Further, in this first embodiment, when the relay system of the data to a transmission destination uses Layer 3, the Layer 2 MAC header is removed from the data packet and data relay is performed. Therefore, the load of data amounts to be transmitted can be reduced and data transmission efficiency can be enhanced.

FIG. 12 is a constructional diagram showing the construction of a second embodiment of the data relay system using the data relay method according to this invention. In the figure, this system logically constitutes the multicast distribution network 40 other than the access network 20 constructed by the network terminating device 21, BAS 22, and the tunnel 23. This multicast distribution network 40 is constituted by the network terminating device 41, BAS 42, and the multicast channel 43, and the BASs 22 and 42 are logically connected to each other.

With regard to the network terminating devices 21 and 41 connected to the IP network 10 of a specified ISP, the port of one network terminating device 21 is logically grouped so that two network terminating devices virtually exist. Further, with regard to the BASs 22 and 42, one BAS 22 is also grouped so that two BASs virtually exist, thus reducing manufacturing cost. Further, the tunnel 23 and the multicast channel 43 indicate that these two logically share one physical line. It should be noted that these network terminating devices 21, 41 and BASs 22, 42 may be constructed as physically discrete units.

Figure 13:
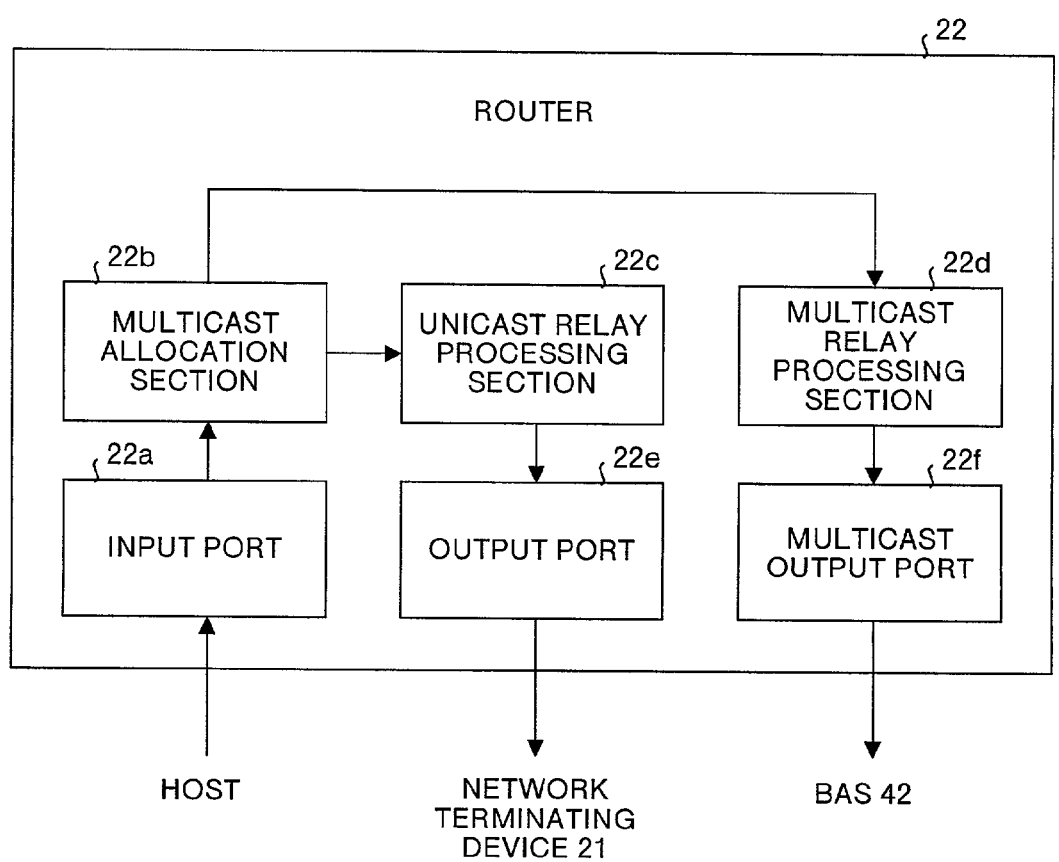
FIG. 13 is a block diagram showing a configuration of a router function of the BAS shown in FIG. 12.

These network terminating device 21 and BAS 22 have a function as a router, and relay received data. The router function of the BAS 22 as a typical one is explained with reference to FIG. 13. In FIG. 13, the BAS 22 comprises the input port 22a to which data is input from the host devices 27 to 29 on the users side connected through the ADSLs 24 to 26, multicast allocation section 22b that allocates the received data, unicast relay processing section 22c that executes relay processing of unicast data targeted for a single traffic, multicast relay processing section 22d that executes relay processing of broadcast data targeted for broadcast to a particular group, output port 22e, and the multicast output port 22f.

The router function of the network terminating device 21 has the same configuration, and the router monitors whether the data contents received from the IP network 10 of the ISP is user data (unicast) or data for multicast, allocates the data according to the data contents, and outputs the data after relay processing.

Figure 14:
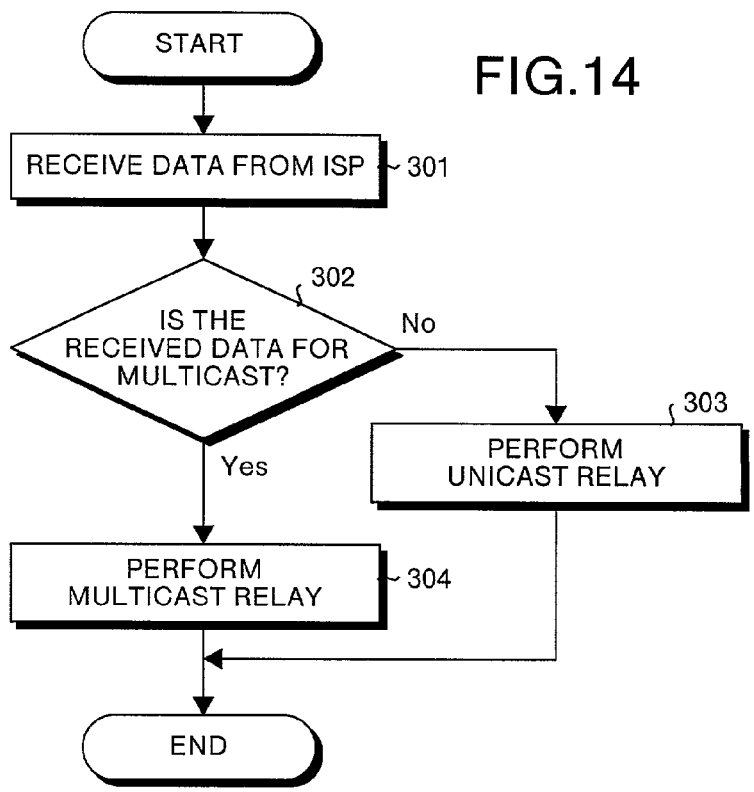
FIG. 14 is a flowchart for explaining packet distributing operation of the network terminating device shown in FIG. 12.
Figure 15:
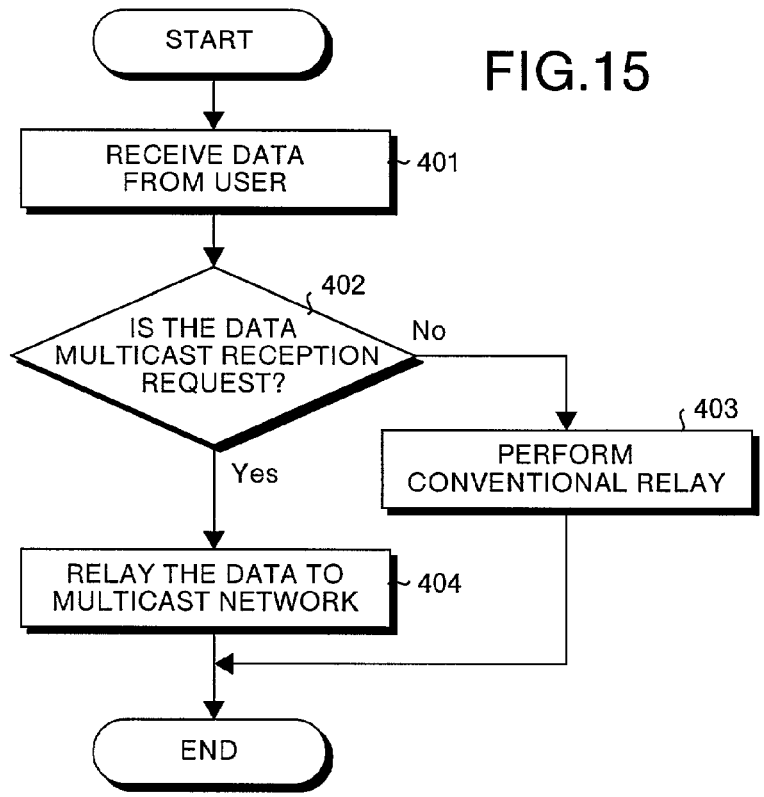
FIG. 15 is a flowchart for explaining packet distributing operation of the BAS shown in FIG. 12.

The packet distributing operation of the system having such a construction will be explained with reference to FIGS. 14 and 15. In FIG. 14, when receiving a packet from the IP network 10 of the ISP (step 301), the network terminating device 21 determines whether the data contents of the received packet is for multicast (step 302). That is, because a range of an IP address in the IP header is different between multicast data and unicast data, the multicast allocation section can easily determine whether the data is for multicast based on the value of this IP address.

When the data contents is for unicast, the unicast relay processing section relays the packet to the BAS 22 through the relay destination tunnel 23 of the access network (step 303). When the data contents is for multicast, the multicast relay processing section relays the packet to the BAS 42 through the multicast channel 43 of the multicast distribution network (step 304).

In the BAS 22, when receiving the unicast data from the network terminating device 21, the unicast relay processing section identifies a host device of a particular user based on the destination address for an individual, and transmits the unicast data to the host device one to one. Further, when receiving multicast data from the network terminating device 21 (logically, the network terminating device 41), the BAS 42 stores the multicast data in the storage unit.

Subsequently, in FIG. 15, when the data is loaded from a given host device into the BAS 22 (step 401), the multicast allocation section determines whether the data contents of the received packet is a packet for a multicast reception request (step 402).

When the data contents is for unicast, the unicast relay processing section performs conventional relay processing such that the packet is relayed to the network terminating device 21 through the relay destination tunnel 23 of the access network (step 403). When the data contents is the multicast reception request, the multicast relay processing section relays the packet to the BAS 42 of the multicast distribution network (step 404).

When receiving the packet of the multicast reception request, the BAS 42 transmits data for the relevant destination address to the BAS 22 from the stored multicast data. The BAS 22 loads the multicast data and distributes the data to the host device that has issued the multicast reception request.

As explained above, in this second embodiment, one-to-one data relay with the host device is executed to the conventional unicast data through the relay destination tunnel of the access network enterprise, while the multicast data is distributed to the host device by routing through the multicast distribution network. Therefore, there is no need to perform data copying for each user, thus performing efficient data distribution by utilizing existing facilities.

Figure 16:
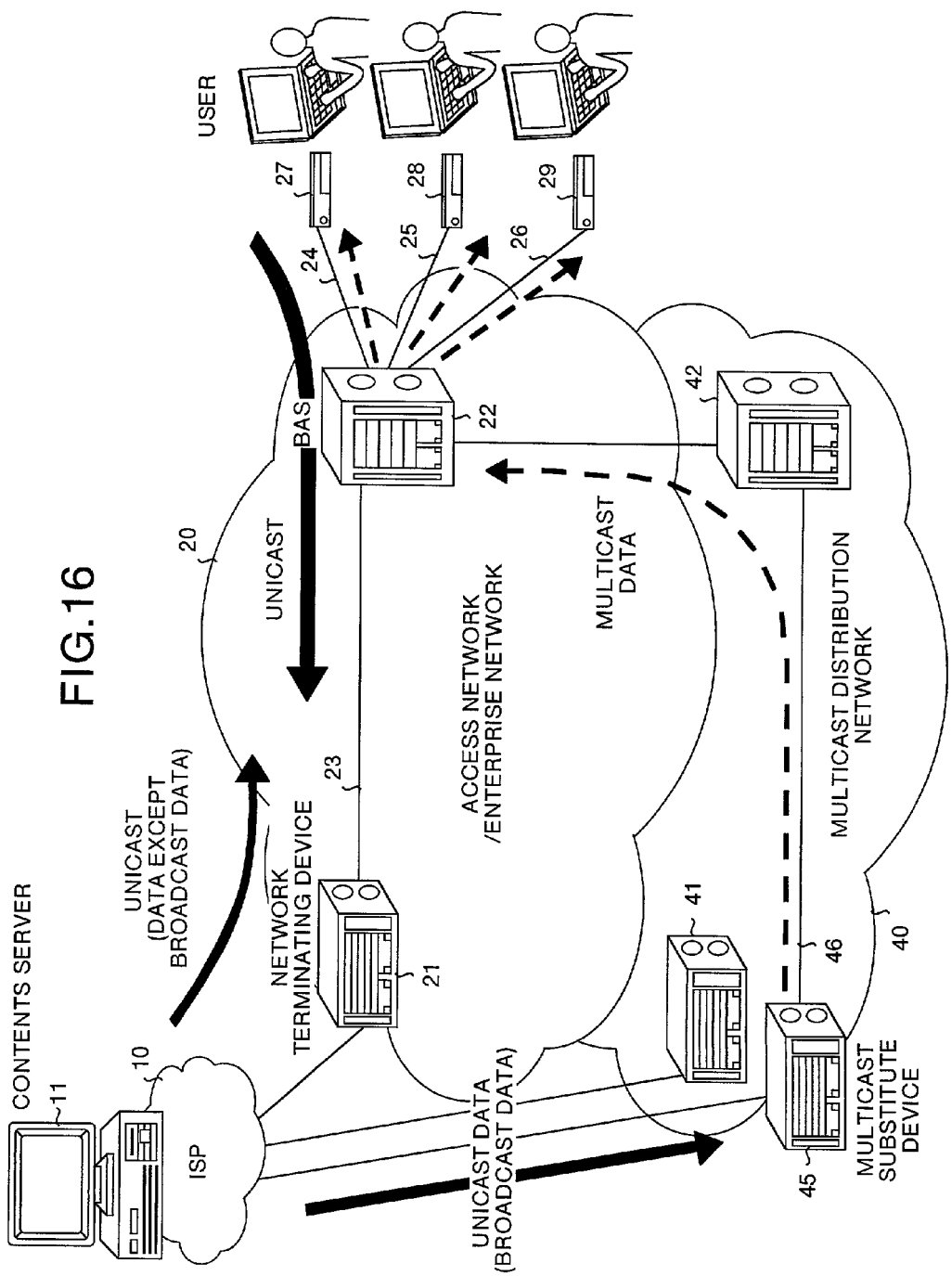
FIG. 16 is a constructional diagram showing a construction of a third embodiment of the data relay system using the data relay method according to this invention.

FIG. 16 is a constructional diagram showing the construction of a third embodiment of the data relay system using the data relay method according to this invention. In the figure, this system has the multicast substitute device 45, that substitutes multicast distribution, provided on the multicast distribution network 40 in addition to the construction of the second embodiment. This multicast substitute device 45 is connected to the IP network 10 of the ISP and is logically connected to the BAS 42 through a multicast channel 46. In this third embodiment, the data, that a user wants to broadcast to a plurality of host devices from the contents server 11, is transmitted to the multicast substitute device 45 (to a particular unicast address set in the multicast substitute device 45).

Figures 17, 18:
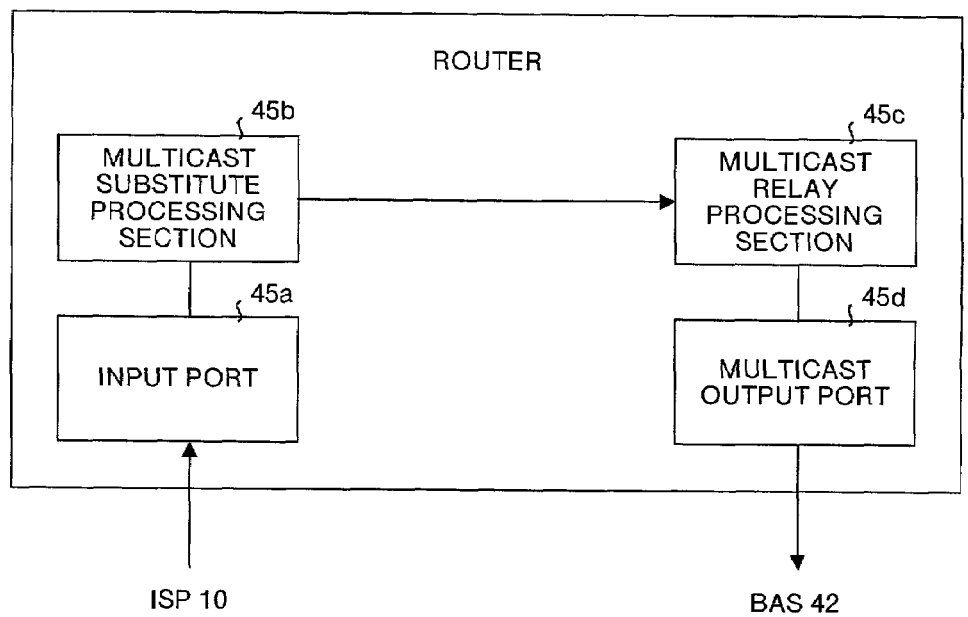
FIG. 17 is a block diagram showing a configuration of the substitute device shown in FIG. 16.
FIG. 18 is a diagram of a table where unicast addresses and corresponding multicast addresses are stored.

The multicast substitute device 45 comprises, as shown in FIG. 17, the input port 45a connected to the IP network 10 of the ISP, multicast substitute processing section 45b that executes substitute processing of the received multicast data, multicast relay processing section 45c that executes relay processing of the multicast data, and the multicast output port 45d.

The multicast substitute processing section 45b has a table for conversion, as shown in FIG. 18, in which the unicast addresses and multicast addresses corresponding to the respective unicast addresses are previously set, and converts the destination address of the received unicast data to the relevant multicast address based on the table. The multicast relay processing section 22d executes relay processing of the converted multicast data and forwards the data to the BAS 42 through the multicast output port.

Figure 19:
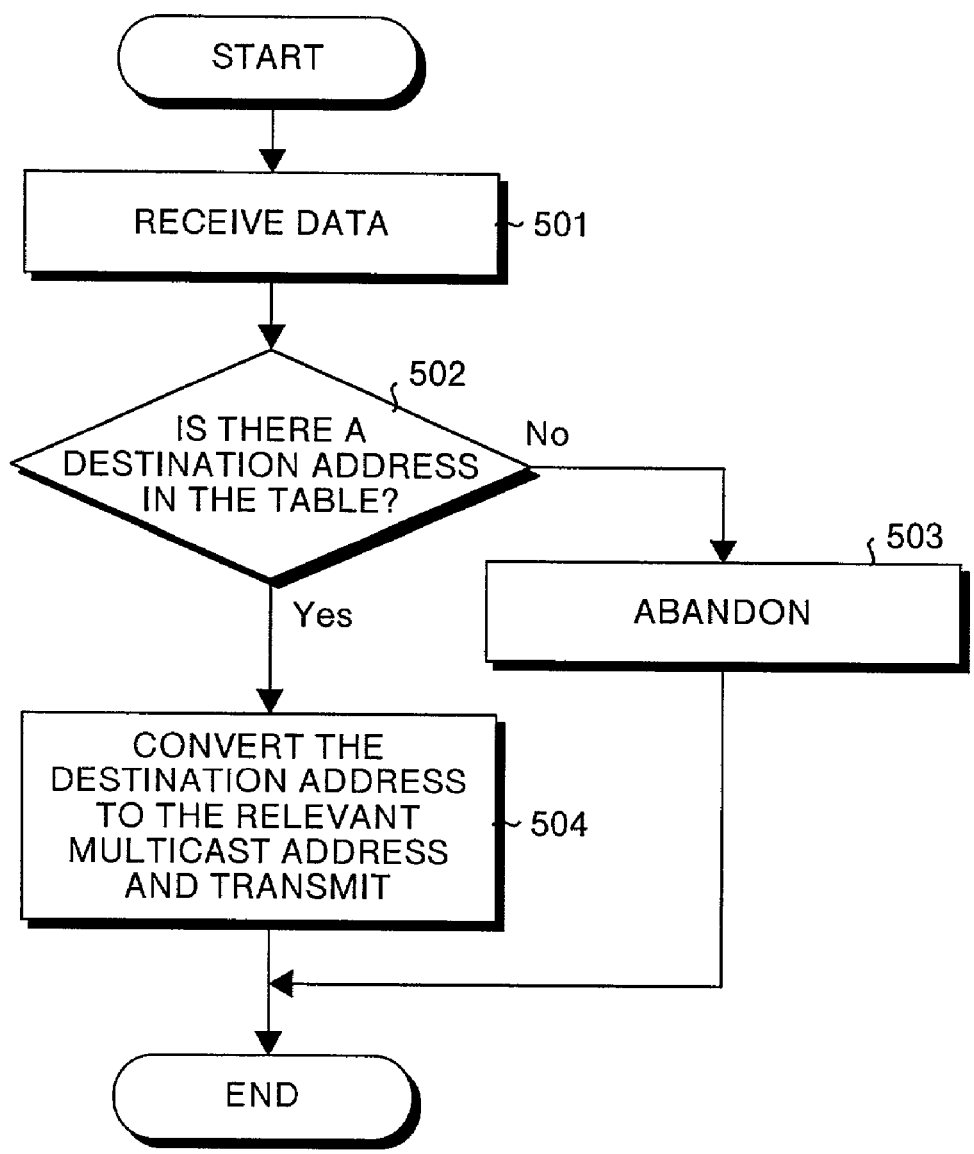
FIG. 19 is a flowchart for explaining operation of substitute processing of the substitute device shown in FIG. 17.

The substitute operation of multicast distribution executed by the multicast substitute device 45 will be explained below with reference to the flowchart of FIG. 19. At first, when data is received from the input port 45a (step 501), the multicast substitute processing section 45b recognizes the destination address of the data and determines whether there is this destination address in the table shown in FIG. 18 (step 502).

When this table has no such destination address, the multicast substitute processing section 45b determines that the data is not targeted for distribution substitute, and abandons the packet (step 503). When the table has such a destination address, the multicast substitute processing section 45b determines that the data is targeted for distribution substitute, performs conversion of the destination address of the data to a relevant multicast address, and then outputs the data to the multicast relay processing section 45c (step 504). The multicast relay processing section 45c executes relay processing of the received multicast data, and forwards the data to the BAS 42 through the multicast output port. As shown in the second embodiment, when receiving the multicast reception request from a host device, the BAS 42 broadcasts the relevant multicast data to the host device.

As explained above, in this third embodiment, the substitute device, that substitutes multicast distribution, is provided within the multicast distribution network of the access provider, and the substitute device converts the unicast address as a destination of the data transmitted from the ISP to a multicast address, and broadcasts the data. Therefore, there is no need to copy the data, thus performing data distribution with high efficiency by utilizing existing facilities.

Further, in this third embodiment, broadcast can be performed by utilizing an independent multicast distribution network provided within an access network/enterprise network without adapting the relay apparatus, which has conventionally been operated between the contents server and the access network/enterprise network, to multicast distribution. Therefore, cost and time required for changing the distribution can be largely reduced.

This invention is not limited by these embodiments, and various modifications may be made in the invention without departing from the spirit and scope thereof.

As explained above, in this invention, the type of the destination MAC address at the Data Link layer level is determined from the data loaded into the IP backbone network. When the type is for broadcast, a relay destination tunnel number is identified from the data contents set in the tunnel control table in correlation with target IP address at the Network layer level, and the data is transmitted only to this relay destination tunnel. Therefore, there is no need to copy the data, thus performing data distribution with high efficiency by utilizing existing facilities.

When the data loaded from a host device is targeted for a single traffic, one-to-one data relay with the host device is performed through the tunnel, and when the data is targeted for broadcast to a particular group, the data is distributed to the host devices by being relayed through the multicast distribution network without passing through the tunnel. Therefore, there is no need to copy data for each user, thus performing data distribution with high efficiency.

When data is transmitted to the substitute device within the public network, the destination address of the data is converted to a previously set multicast address, the data is forwarded to the multicast network within the public network, and is broadcasted to the users. Therefore, there is no need to copy the data, and data distribution with high efficiency can be performed by utilizing existing facilities. Further, the data can be also broadcasted by utilizing the multicast distribution network independently provided within the public network without adapting the relay apparatus, which has conventionally been operated between the backbone network and the public network, to the multicast distribution. Thus, cost and time required for changing the distribution can largely be reduced.

What is claimed is:

1. A data relay system having a logical tunnel established within a specified public network interposed between a specified backbone network and host devices, which relays data between the backbone network and the host devices through the logical tunnel, the system comprising:

a first data relaying apparatus, disposed within the specified public network, for relaying data between the backbone network and the host devices through the logical tunnel established within the public network, the data relaying apparatus comprising a first type determination unit configured to monitor contents of the data laded from the host device and determine a type of the data;

a first relay unit configured to relay data through the tunnel when the type of the data is targeted for a single traffic; and a first control processing unit configured to perform control processing on the data without being routed through the tunnel when the data is a predetermined control packet, wherein when the data loaded from said host device is the predetermined control packet, the first data relaying apparatus performs control processing so as to relay the data without routing through the logical tunnel;

a second data relay apparatus, disposed within the specified public network for relaying data between the backbone network and the host devices said second data relay apparatus comprising a second type determination unit configured to monitor contents of the data loaded from the backbone network and determine a type of the data;

a second relay unit configured to relay data through the tunnel when the type of the data is targeted for a single traffic; and a storage control unit configured to store the data when the type of the data is targeted for broadcast to a particular group; and a third data relay apparatus, disposed within the a specified public network, for relaying data between the backbone network and said host devices, said second data relay apparatus comprising a third type determination unit configured to monitor contents of the data loaded from said host device and determines a type of the data;

a third relay unit configured to relay data through the tunnel when the type of the data is targeted for a single traffic; and a second control processing unit configured to control processing on the data without being routed through the tunnel when the data is a predetermined control packet, wherein said second control processing unit of said third data relay apparatus performs control processing so as to relay the data, as a target to be controlled stored by said storage control unit of said first data relay apparatus, to said host device that has issued a specified reception request.

\* \* \* \* \*